March 12, 1957  W. F. ALLER  2,784,485
PROCESS FOR ASSEMBLING BALL BEARINGS
Filed July 1, 1950  2 Sheets-Sheet 1
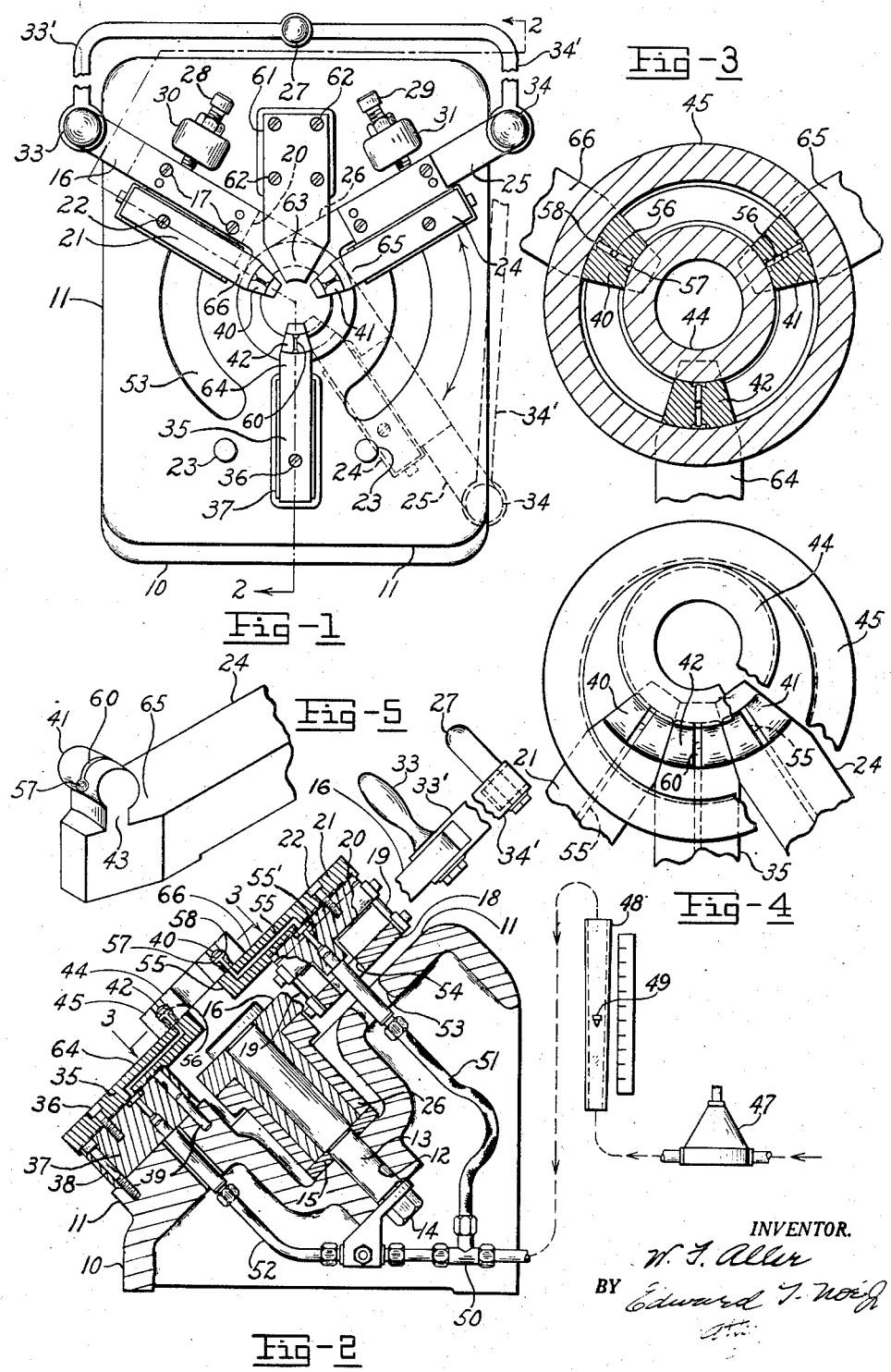
INVENTOR.
W. F. Aller
BY Edward J. Noe March 12, 1957 W. F. ALLER 2,784,485
PROCESS FOR ASSEMBLING BALL BEARINGS
Filed July 1, 1950 2 Sheets-Sheet 2
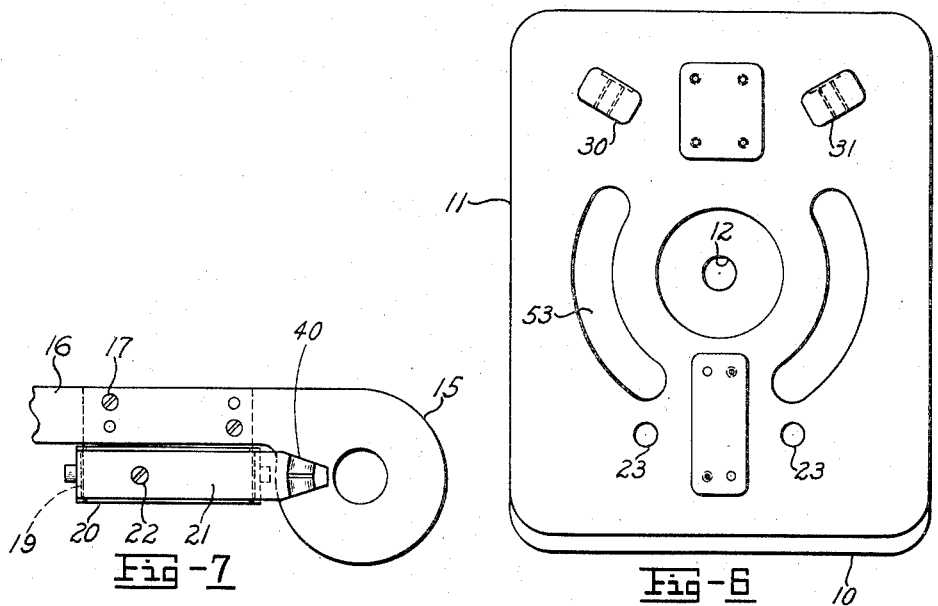
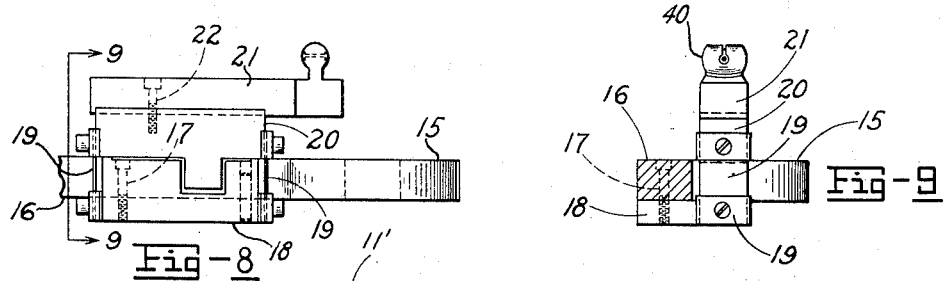
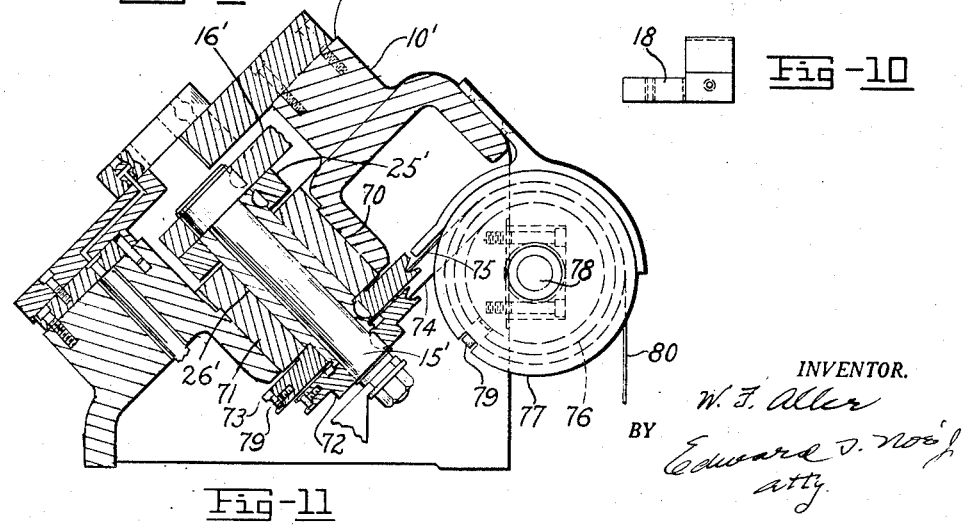
INVENTOR.
W. F. Aller
BY Edward D. Noel
atty.

United States Patent Office 2,784,485
Patented Mar. 12, 1957

2,784,485

PROCESS FOR ASSEMBLING BALL BEARINGS

Willis Fay Aller, Dayton, Ohio, assignor to The Sheffield Corporation, Dayton, Ohio, a corporation of Ohio Application July 1, 1950, Serial No. 171,737

3 Claims. (Cl. 29—148.4)

This invention relates to antifriction bearings and more particularly to the method of their manufacture. This application is a continuation-in-part of my prior application, Serial No. 120,402, filed October 8, 1949, now Patent No. 2,687,038.

One of the most critical problems concerning quality in the manufacture of anti-friction bearings is in the proper matching of the races and the rolling elements (balls or rollers) employed therewith, in such a way as to control radial play to any desired tolerance. Prior to this invention the three bearing elements were gauged independently with precision, that is, the inner diameter of the outer race, the outer diameter of the inner race, and the diameter of the rolling elements where gauged. Thus, by proper selection of sizes from the elements so gauged, the desired result has been approached. For example, in practicing the above method manufacturers of anti-friction bearings usually classify the rolling elements, subsequent to gauging, into groups of known size, with the size of the balls or rollers in each group differing from that of other groups by small increments. Hence, after independently gauging an outer and an inner race, and subtracting their diameters to determine the proper size of the rolling elements to be used therewith, balls or rollers of the proper size can be selected from the classified groups of rolling elements.

The diameter of the inner race plus two ball or roller diameters, however, must very nearly equal the diameter of the outer race, or the assembled bearing will have too much or too little radial play. The foregoing method permits an accumulation of variations from exact sizes that may result in a rather large error and require teardown and reassembly of a bearing with a different size ball after checking the radial clearance of the assembly. For example, even though each of the three elements of a bearing were gauged to an accuracy of one ten-thousandth of an inch, the radial clearance of the assembled bearing may be in error by as much as four ten-thousandths of an inch. In other words, independent gauging of the elements permits of cumulative errors in the assembly. Hence, rejections are high.

Accordingly, it is an object of this invention to provide a method of matching the several elements, i. e. the races and balls or rollers, of an anti-friction bearing to control radial play to a tolerance equal to the tolerance permitted in gauging only one of the elements.

It is another object of this invention to eliminate the possibility of cumulative gauging errors which affect the radial play of an assembled anti-friction bearing.

It is still another object of this invention to provide an improved method of assembling anti-friction bearings in accordance with a direct determination of the size of one element necessary to be used with two other elements of unknown size.

It is a further object of this invention to provide a method of assembling anti-friction bearings which will greatly reduce or eliminate rejects of assembled bearings and/or tear-down and rebuilding thereof because of excessive or too little radial play.

Other objects and advantages of the invention will be apparent from the following description, the appended claims and the accompanying drawing, in which Fig. 1 is a view of the working face of one form of a gauging apparatus by which the parts may be gauged in carrying out the method of the present invention;

Fig. 2 is a section on the line 2—2 of Fig. 1;

Fig. 3 is a section on an enlarged scale on the line 3—3 of Fig. 2 showing how an average reading of the spacing between inner and outer ball bearing races is determined;

Fig. 4 is a view on an enlarged scale of bearing races that may be gauged and of the centering and gauging devices in their loading positions;

Fig. 5 is a detail view on an enlarged scale showing one of the gauge heads and its carrying arm;

Fig. 6 is a detail view showing the gauge base;

Figs. 7, 8 and 9 are details showing the movable arm 16 and the spring supported arm 21 which it carries;

Fig. 10 is a detail showing an angle block; and

Fig. 11 is a central vertical section of a modification arranged for foot operation.

The essential feature of this invention consists in assembling the inner and outer bearing races in concentric arrangement and directly measuring the average radial clearance therebetween. Hence, a bearing manufacturer can tell before assembly exactly how much space will be left between the inner and outer races of an anti-fraction bearing. Thus, by measuring a quantity of one of the elements of the bearing and classifying such quantity in groups of known size that differ in size from one another by only a small increment, and by a proper preliminary gauging operation of inner and outer bearing races, one arranged concentrically within the other, the operator can determine the exact size of parts to be assembled together to give a desired or predetermined radial clearance. Extreme accuracy in this size determination exists since an average radial clearance that exists between inner and outer raceways is directly determined instead of independently gauging an inner race and an outer race and then subtracting the difference.

When the bearing manufacturer employs a standard size ball, for example, and assembles inner and outer races to fit one fixed ball size, the inner races may be classified and segregated into groups all within a predetermined size range but differing from one another by a small increment. An inner race of known size is then employed in the guaging operation and an unknown outer race is compared with it so that the resultant reading indicates the inner race size that should be used for that particular outer race to make a desired assembly. It is preferred, however, that the bearing manufacturer classify the balls or rollers into different size groups, and employ a gauging operation in which inner and outer races of nominal sizes, but unclassified as to actual deviation, are taken at random. These races are then arranged one within the other in substantial concentric relationship and an average reading of the radial clearance is obtained at different points spaced apart within the raceways to determine the exact ball or roller size required for those two particular races. This makes possible the accurate control of radial play tolerances from zero up to any desired actual clearance that may be desired. Finished inventory and work in process can be accurately controlled since the operator can determine in advance the particular size requirements of needed parts. The assembly time is reduced since teardown and rebuilding to obtain desired quality are practically eliminated.

As an example of the method of this invention the bearing manufacturer may classify balls in groups of (a) .5", (b) .5002", (c) .5004", (d) .5006" (e) .5008" diameter. The outer races may have a raceway diameter of about 3" and the inner raceway diameter may be about 2" each with a possible variation of perhaps plus .0005" and minus .0005". A normal operating total radial clearance or play of .0002" may be desired in the assembled bearing. With master races of known size of 3.0002" and 2.0", for example, for the outer and inner raceways a certain indication is obtained on the gauge's calibrated scale corresponding to ball size (a). With additional master races of known sizes of 3.0018" and 2" for the outer and inner raceways another indication is obtained on the gauge's calibrated scale corresponding to ball size (e) and between these two indications are additional indications corresponding to ball sizes (b), (c) and (d). Having properly set up the gauge, an outer race is selected at random and matched against an inner race selected at random. These two races may have diameters of 3" and 1.9990". The gauge would show that balls from group (c) should be assembled with these particular inner and outer races to give the required radial clearance of the assembled structure. Actually, however, the operator would not know just what the exact diameters of the raceways would be since he is merely gauging precisely the radial clearance existing between the inner and outer raceways. The next pair of inner and outer races to be gauged may have diameters of 2.996" and 1.9954" respectively and thus require a ball size of classification (b).

One way in which the gauging operation may be carried out in the manufacture of ball bearings is by the use of a gauging device such as is more particularly shown in Figs. 1 to 11 of the drawing. This device employs a gauge base 10 having an upper inclined wall 11 in which is a central inclined bore 12 receiving a stationary shaft 13 that is secured in place by nut 14. Rotatably mounted on the shaft 13 is an inner sleeve 15 having a tangential arm 16. Fixed to the lower side of the arm 16, as by screws 17, is a laterally projecting plate 18 (Figs. 7–9). Mounted on the plate 18, by a pair of parallel flat spring blades 19, is a carrying block 20. A gauge arm 21 is fastened to the carrying block 20 by screw 22 in a position extending radially of the shaft 13. The spring blades 19 support the gauge arm 21 for limited radial movement on the arm 16 and it will be apparent that since the sleeve 15 is rotatably supported on the shaft 13 the position of the gauge arm 21 can be angularly adjusted from the position shown in full lines in Fig. 1 to a lowered position in which it is near the lower portion of the wall 11 of the base with the plate 18 abutting against a stop 23.

Operably mounted on the base 10 in a similar manner is another gauge arm, as shown at 24, connected through parallel spring blades to a tangential arm 25 in the same manner that the arms 21 and 16 are connected. The arm 25 projects tangentially from the end portion of an outer sleeve 26 which is rotatably mounted on the sleeve 15. Stop screws 28 and 29 adjustably carried in brackets 30 and 31 limit the travel of the arms 16 and 25 in an upward direction. Dotted lines shown in Fig. 1 represent the position assumed by the arms 24 and 25 when they are lowered into loading position. Either or both of the arms 16 and 25 may be angularly moved by the operator by means of handles 33 and 34 connected through pivotally interconnected links 33' and 34' to a common handle 27 which may be moved to simultaneously and equally adjust both of the arms 16 and 25.

On the lower portion of the wall 11 of the base is a stationary gauge arm 35 held in place by attaching screw 36 on a spacing block 37 (see Fig. 2) which is attached by means of a screw 38 and a dowel 39 to the gauge base. Directly opposite the arm 35 is a rest plate 61 (Fig. 1) held on the wall 11 by screws 62. The upper flat surface 63 of this rest plate lies in the same inclined plane that contains the upper surface 64 of gauge arm 35 and upper surfaces 65 and 66 of gauge arms 24 and 21, respectively.

The three gauge arms 21, 24 and 35 are each provided with a gauging and spacing head, these heads bearing reference numerals 40, 41 and 42, respectively, and being of similar construction. The head 41 of the arm 24, best shown in Fig. 5, is approximately the shape of a torus segment and is of such size and shape as to fit with an operating clearance between the inner and outer raceways of antifriction bearing races to be gauged. The head 41 is connected to gauge arm 24 by means of a finger 43 having a width, as will be apparent from Fig. 2, so that it may be received with operating clearance between the inwardly extending flanged portions of the races when the latter are concentrically arranged with respect to one another.

It will now be obvious that the three gauging and centering heads 40, 41 and 42 may be moved relatively by the operator so that they assume closely adjacent positions, as shown in Fig. 4, merely by lowering the two arms 16 and 25. This is the loading position of these members and in such positions they are adapted to support the lower side of an inner bearing race 44. The fingers 43 are of such length that the side of the inner race rests against the outer plane surfaces 64, 65 and 66 of the arms that carry the gauging and centering heads, and also against the surface 63 of the rest plate 61. The inner race then assumes an inclined position as shown in Fig. 2. An outer bearing race 45 is then placed on the upper side of the inner race, the two races being eccentric so that there is a considerable space between the inner and outer races. The outer race rests against outer surfaces of the arms that carry the gauging and centering heads. The operator then grasps the handle 27 and moves it upwardly so as to swing the two heads 40 and 41 to predetermined positions in which they are widely spaced from the head 42 and preferably to positions where the three heads are equally spaced apart (circumferentially of the clearance torus between the two races) as determined by the stops 28 and 29. As the heads 40 and 41 move upwardly about the axis of the shaft 13 they act on the raceway of the outer race so as to lift the outer race and centralize it with respect to the inner race. If desired, the lower part of both races may be pressed against the head 42 as the handle 27 is moved. The parts thus assume the position indicated in Fig. 3, and in this position, even if either one or the other of the races may be considerably oversize or undersize, the heads 40 and 41 will not bear tightly against either race since the spring blade mountings of the two upper gauge arms permit them to yield radially and assume a substantially free position inside the races.

The gauging heads are provided with gauging means so that the average distance between the raceways in the plane of symmetry can be determined. Thus, the size of the balls or rolling members to be used with the two races can be accurately determined and the proper selection made. The gauging is accomplished by measuring the fluid flow that takes place through radially extending passages in the heads that terminate adjacent the inner and outer raceways in the plane of symmetry. The space between the raceways determines the amount of leakage that takes place through the terminal openings of the passages. Air under pressure is supplied through a suitable pressure regulator 47 (Fig. 2) and then through a flow determining means, which in the example shown is illustrated as an upwardly tapered tube 48 having a float or indicator 49. The height assumed by the indicator in the tube gives an indication of the amount of flow taking place through the tube at any time. The upper end of the tube 48 is connected to a coupling member 50 through which air is supplied to a tube 52 and two flexible conduits or hose connections one of which is indicated in Fig. 2 at 51. These flexible conduits 51 are similarly connected to gauging passages in the gauging heads 40 and 41. The conduit 51 for the head 40 extends freely through an arcuate slot 53 in the wall 11 of the base, through a clearance hole 54 in the plate 18 and communicates with a passage 55' in the carrying block 20. Passage 55' communicates in turn with a passage 55 in the gauge arm 21 and this passage leads to a radially extending passage 56 (Fig. 3) in the head 40. The opposite ends of the passage 56 terminate in discharge openings 57 and 58 (Figs. 3 and 5) which are recessed a few ten-thousandths of an inch inwardly of the gauging head. Shallow air discharge channel slots 60 as shown in Figs. 4 and 5 are cut in the outer portions or surfaces of the gauging head to extend between points closely adjacent the ends of the passage 56 for the discharge of the air at a place remote from the central plane of the raceways. It will be obvious that the distance between the inner and outer raceways will determine the amount of leakage taking place at the ends of the passage 56. The tube 52 extends through the wall 11 to a passageway through the block 37, see Fig. 2, and communicates with a gauging passage in the head 42. Since each gauging head is provided with a similar gauging passage as shown in Fig. 3, all connected to the supply fitting 50, the measurement of the fluid flow taking place gives the average distance between the raceways so that by suitably calibrating the indications of the flow measuring device or by comparing the indication obtained for any cooperating pair of bearing races with that obtained when setup masters are used, the size of the ball or antifriction members that should be used with the particular raceways gauged can be accurately determined.

The operator does not need to know the exact size of either the inner raceway or the outer raceway. Either one may be slightly larger or smaller than an exact standard but by comparing and gauging an outer race directly with the cooperating inner race with which the former will be assembled, the exact size of the balls to be used with those races can be determined and balls of the proper size can be selected in the actual assembling operation.

The gauging apparatus shown in Fig. 11 is similar to that shown in Figs. 1 to 10 except that it is arranged for foot operation through a cable 80 controlling pulley wheels 76, 77 to oppositely move cables 74, 75 and wheels 72, 73 connected respectively to the two arms 16' and 25'. These correspond to the arms 16 and 25 of the apparatus shown in Figs. 1 to 10.

While the method herein described constitutes a preferred embodiment of the invention, it is to be understood that the invention is not limited thereto, and that changes may be made therein without departing from the scope of the invention which is defined in the appended claims.

What is claimed is:

1. The method of making a ball bearing having inner and outer races and balls therebetween, the steps comprising: making inner and outer ball races having grooves providing ball receiving raceways, the diameters of which are within a normal acceptacle tolerance range; making balls for said races of different sizes; gauging and classifying said balls into groups of successive different known sizes; positioning said inner race concentrically with said outer race in the position it assumes in normal operation; gauging the spacing between the raceways of the thus positioned races to determine the size of the balls that should be assembled therewith; and assembling with the gauged races balls from that group determined by the gauging indication of the gauged space to be of the proper size for said races.

2. The method of making a ball bearing having inner and outer races and balls therebetween, the steps comprising: making inner and outer ball bearing races having grooves providing ball receiving raceways, the diameters of which are within a normal acceptable tolerance range; making balls for said races of different sizes; gauging and classifying said balls into groups of successive different known sizes with the size of the balls in each group differing from that of the next adjacent groups by only a fractional part of the tolerance range of said raceways; positioning said inner race concentrically with said outer race; gauging the radial spacing between the raceways of the thus positioned races to determine the size of the balls that should be assembled therewith by gauging air leakage directed laterally against the raceways through fluid leakage orifices disposed between the raceways and escaping between the orifices and the raceways themselves; and assembling with the gauged races balls from that group determined by the gauging indication of the gauged space to be of the proper size for said races.

3. The method of making a ball bearing, the steps comprising: making inner and outer ball bearing races; classifying balls for use with said races into groups of successive different known sizes; positioning an inner and an outer race concentrically one within the other; gauging the radial spacing between the raceways of the thus positioned races at a plurality of localized points to determine the average size of such spacing in order to find the size of the balls that should be assembled with said races; and assembling with said races balls from that group determined by the gauging indication of the gauged space to be of the proper size for said races.

References Cited in the file of this patent
UNITED STATES PATENTS

| Number | Name | Date |
|---|---|---|
| 942,392 | Koch | Dec. 7, 1909 |
| 1,748,971 | Buckwalter | Mar. 4, 1930 |
| 1,748,973 | Buckwalter | Mar. 4, 1930 |
| 2,024,020 | Aldeborgh | Dec. 10, 1935 |
| 2,118,756 | Bergert | May 24, 1938 |
| 2,419,280 | Neff | Apr. 22, 1947 |
| 2,431,014 | Aller | Nov. 18, 1947 |
| 2,431,087 | Subber | Nov. 18, 1947 |
| 2,636,379 | Van Dorn | Apr. 28, 1953 |